US012627930B2

(12) United States Patent
Wang et al.

(10) Patent No.: US 12,627,930 B2
(45) Date of Patent: May 12, 2026

(54) SOUND GENERATOR AND AUDIO DEVICE

(71) Applicant: GOERTEK INC., Weifang (CN)

(72) Inventors: Miaomiao Wang, Weifang (CN); Xiaodong Guo, Weifang (CN); Chengfei Zhang, Weifang (CN); Chunfa Liu, Weifang (CN)

(73) Assignee: GOERTEK INC., Weifang (CN)

( * ) Notice: Subject to any disclaimer, the term of this patent is extended or adjusted under 35 U.S.C. 154(b) by 182 days.

(21) Appl. No.: 18/400,090

(22) Filed: Dec. 29, 2023

(65) Prior Publication Data

US 2024/0147163 A1 May 2, 2024

Related U.S. Application Data

(63) Continuation of application No. PCT/CN2023/080542, filed on Mar. 9, 2023.

(30) Foreign Application Priority Data

Apr. 29, 2022 (CN) ........................ 202210484369.9

(51) Int. Cl.
*H04R 9/02* (2006.01)
*H04R 1/24* (2006.01)
(Continued)

(52) U.S. Cl.
CPC ............... *H04R 9/025* (2013.01); *H04R 1/24* (2013.01); *H04R 7/18* (2013.01); *H04R 1/10* (2013.01); *H04R 7/12* (2013.01); *H04R 9/045* (2013.01)

(58) Field of Classification Search
CPC ... H04R 1/10; H04R 1/28; H04R 1/24; H04R 1/00; H04R 1/26; H04R 5/033;
(Continued)

(56) References Cited

U.S. PATENT DOCUMENTS

| | | | | |
|---|---|---|---|---|
| 9,674,603 B1 * | 6/2017 | Yeh | | H04R 9/025 |
| 2015/0139479 A1 * | 5/2015 | Lai | | H04R 9/025 381/412 |
| 2024/0284111 A1 * | 8/2024 | Li | | H04R 9/045 |

FOREIGN PATENT DOCUMENTS

| | | | |
|---|---|---|---|
| CN | 2208303 Y | 9/1995 | |
| CN | 201781608 U * | 3/2011 | H04R 1/20 |

(Continued)

OTHER PUBLICATIONS

First Office Action issued in Chinese Patent Application No. 202210484369.9; mailed Mar. 28, 2024; 17 pgs.

(Continued)

*Primary Examiner* — Ahmad F. Matar
*Assistant Examiner* — Sabrina Diaz
(74) *Attorney, Agent, or Firm* — HAUPTMAN HAM, LLP

(57) ABSTRACT

Disclosed are a sound generator and an audio device. The sound generator includes a magnetically conductive plate, a first magnetic structure, a second magnetic structure, a treble diaphragm, a treble voice coil, a bass diaphragm and a bass voice coil. The first magnetic structure includes a first washer including a first sub-washer located and a second sub-washer provided surrounding the first sub-washer, and a treble magnetic gap is formed between the first sub-washer and the second sub-washer. A bass magnetic gap is formed between the first magnetic structure and the second magnetic structure. The treble voice coil is provided on a side of the treble diaphragm close to the magnetically conductive plate and is provided corresponding to the treble magnetic gap. The bass voice coil is provided on a side of the bass diaphragm close to the magnetically conductive plate and is provided corresponding to the bass magnetic gap.

8 Claims, 7 Drawing Sheets

(51) Int. Cl.
*H04R 7/18* (2006.01)
*H04R 1/10* (2006.01)
*H04R 7/12* (2006.01)
*H04R 9/04* (2006.01)

(58) Field of Classification Search
CPC ...... H04R 2205/022; H04R 9/00; H04R 9/06; H04R 9/045; H04R 9/025; H04R 7/00; H04R 7/122; H04R 7/18; H04R 7/12; H04R 2209/026
USPC .......... 381/412, 182, 184, 186, 423, 370, 74
See application file for complete search history.

(56) References Cited

FOREIGN PATENT DOCUMENTS

| | | | | | |
|---|---|---|---|---|---|
| CN | 103796142 | A | | 5/2014 | |
| CN | 205017577 | U | | 2/2016 | |
| CN | 105828246 | A | | 8/2016 | |
| CN | 206640782 | U | * | 11/2017 | ............... H04R 9/02 |
| CN | 207884878 | U | * | 9/2018 | ............... H04R 9/02 |
| CN | 208675521 | U | | 3/2019 | |
| CN | 111935591 | A | | 11/2020 | |
| CN | 113691912 | A | | 11/2021 | |
| CN | 114979907 | A | | 8/2022 | |
| WO | 2022006968 | A1 | | 1/2022 | |

OTHER PUBLICATIONS

International Search Report and Written Opinion issued in International Patent Applicatino No. PCT/CN2023/080542; mailed Apr. 21, 2023; 12 pgs.

* cited by examiner

SOUND GENERATOR AND AUDIO DEVICE

CROSS-REFERENCE TO RELATED APPLICATIONS

This application is a continuation application of International Application No. PCT/CN2023/080542, filed on Mar. 9, 2023, which claims priority to Chinese Patent Application No. 202210484369.9, filed on Apr. 29, 2022. The disclosures of the above-mentioned applications are incorporated herein by reference in their entireties.

TECHNICAL FIELD

The present application relates to the technical field of electroacoustic conversion, and in particular, to a sound generator and an audio device.

BACKGROUND

The sound generator is an important acoustic component in an audio device. It is a transducer device that converts electrical signals into acoustic signals. The audio device includes headphones, speakers, mobile phones, computers and others. Nowadays, full-band sound quality is increasingly pursued in the market. In order to meet the full-band sound quality, many multi-unit audio devices that combine treble and bass units have emerged, that is to say, one audio device is provided with a treble unit and a bass unit. However, although the existing multi-unit audio device solves the problem of full frequency bands, it also leads to an increase in the size of the sound generator and increases the difficulty of assembling the entire audio device.

SUMMARY

The main purpose of the present application is to provides a sound generator, which aims to achieve miniaturization of sound generators, thereby facilitating to assembly of audio device.

In order to achieve the above purpose, the present application provides a sound generator, including:

- a magnetically conductive plate;
- a first magnetic structure including a first magnet and a first washer connected to the first magnet, wherein the first magnet is provided on the magnetically conductive plate, the first washer is fixedly connected to a side of the first magnet away from the magnetically conductive plate, the first washer includes a first sub-washer provided in a middle area and a second sub-washer provided surrounding the first sub-washer, and a treble magnetic gap is formed between the first sub-washer and the second sub-washer;
- a second magnetic structure provided on the magnetically conductive plate and provided surrounding the first magnetic structure, wherein a bass magnetic gap is formed between the first magnetic structure and the second magnetic structure;
- a treble diaphragm and a treble voice coil, wherein the treble voice coil is provided on a side of the treble diaphragm close to the magnetically conductive plate and is provided corresponding to the treble magnetic gap; and
- a bass diaphragm and a bass voice coil, wherein the bass voice coil is provided on a side of the bass diaphragm close to the magnetically conductive plate and is provided corresponding to the bass magnetic gap.

In some embodiments, the first magnet is configured as an integral structure, a first magnetic zone is formed in a middle position of the first magnet, a second magnetic zone is formed surrounding the first magnetic zone, and a non-magnetic zone is formed between the first magnetic zone and the second magnetic zone;

- a magnetizing direction of the first magnetic zone is opposite to a magnetizing direction of the second magnetic zone, the first sub-washer is provided corresponding to the first magnetic zone, and the second sub-washer is provided corresponding to the second magnetic zone; and
- the magnetizing direction of the first magnetic zone is the same as a magnetizing direction of a magnet of the second magnetic structure.

In some embodiments, the treble voice coil is provided corresponding to the non-magnetic area, and a ring width of the non-magnetic area is smaller than a ring width of the treble voice coil; and/or

- a diameter of the first magnetic zone is less than or equal to a ring width of the second magnetic zone.

In some embodiments, the first magnet includes a first sub-magnet and a second sub-magnet, the first sub-magnet and the second sub-magnet are separately provided, the second sub-magnet is provided surrounding the first sub-magnet, and a magnetizing direction of the first sub-magnet is opposite to a magnetizing direction of the second sub-magnet;

- the first sub-washer is fixedly connected to the first sub-magnet, and the second sub-washer is fixedly connected to the second sub-magnet; and
- the magnetizing direction of the first sub-magnet is the same as a magnetizing direction of a magnet of the second magnetic structure.

In some embodiments, a gap between the first sub-magnet and the second sub-magnet is smaller than a gap between the first sub-washer and the second sub-washer; and/or

- a diameter of the first sub-magnet is less than or equal to a ring width of the second sub-magnet.

In some embodiments, a sound outlet is provided at a position of the sound generator facing the treble diaphragm and is configured to radiate sound waves of the treble diaphragm;

- the sound outlet is provided corresponding to a center area of the bass diaphragm, and the bass diaphragm is provided with an avoidance hole to avoid the sound outlet; and
- the bass diaphragm is provided on a side of the treble diaphragm away from the magnetically conductive plate.

In some embodiments, the sound generator further includes a cover provided on a side of the treble diaphragm away from the magnetically conductive plate and covering the second sub-washer;

- wherein the cover is provided with the sound outlet, the avoidance hole is provided corresponding to the sound outlet, and an inner periphery of the bass diaphragm corresponding to the avoidance hole is fixedly connected to the cover.

In some embodiments, the sound generator further includes an auxiliary magnet fixedly provided on the cover, wherein the auxiliary magnet is provided with a communication hole at a position facing the sound outlet.

In some embodiments, the sound generator further includes an auxiliary magnet;

- wherein the auxiliary magnet is provided on the side of the treble diaphragm away from the magnetically conductive plate, an edge of the auxiliary magnet is fixedly connected to a side of the second sub-washer away from the magnetically conductive plate, a receiving space for accommodating the treble diaphragm is formed between the auxiliary magnet and the first washer, the auxiliary magnet is provided with the sound outlet, the avoidance hole is provided corresponding to the sound outlet, and an inner periphery of the bass diaphragm corresponding to the sound outlet is fixedly connected to the auxiliary magnet.

In some embodiments, a side of the second sub-washer away from the magnetically conductive plate is provided with a mounting ring protrusion, and an outer periphery of the treble diaphragm is fixedly connected to the mounting ring protrusion; and/or the second magnetic structure includes a second magnet and a second washer, the second magnet is fixedly connected to the magnetically conductive plate, and the second washer is fixedly connected to a side of the second magnet away from the magnetically conductive plate.

The present application further provides an audio device including the above-mentioned sound generator.

In some embodiments, the audio device is an earphone.

In the technical solution of the present application, while forming a treble magnetic gap, the first magnetic structure also forms a bass magnetic gap with the second magnetic structure, which is conducive to simplifying the magnetic structure of the sound generator and reducing the axial dimension of the sound generator. Specifically, at least a bass magnetic gap is formed between the second sub-washer and the second magnetic structure, the bass voice coil is inserted in the bass magnetic gap, and the first magnetic structure can be at least partially accommodated inside the bass voice coil, which is beneficial to further reduce the axial size of the sound generator. In this way, the sound generator can be miniaturized, which is beneficial to improving the assembly convenience of the audio device. Moreover, in the present application, the treble vibration system and the bass vibration system are set up independently, so that the treble sound and the bass sound are generated without interfering with each other, which is beneficial to ensuring the acoustic performance of the sound generator.

BRIEF DESCRIPTION OF THE DRAWINGS

In order to more clearly illustrate the technical solutions in some embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
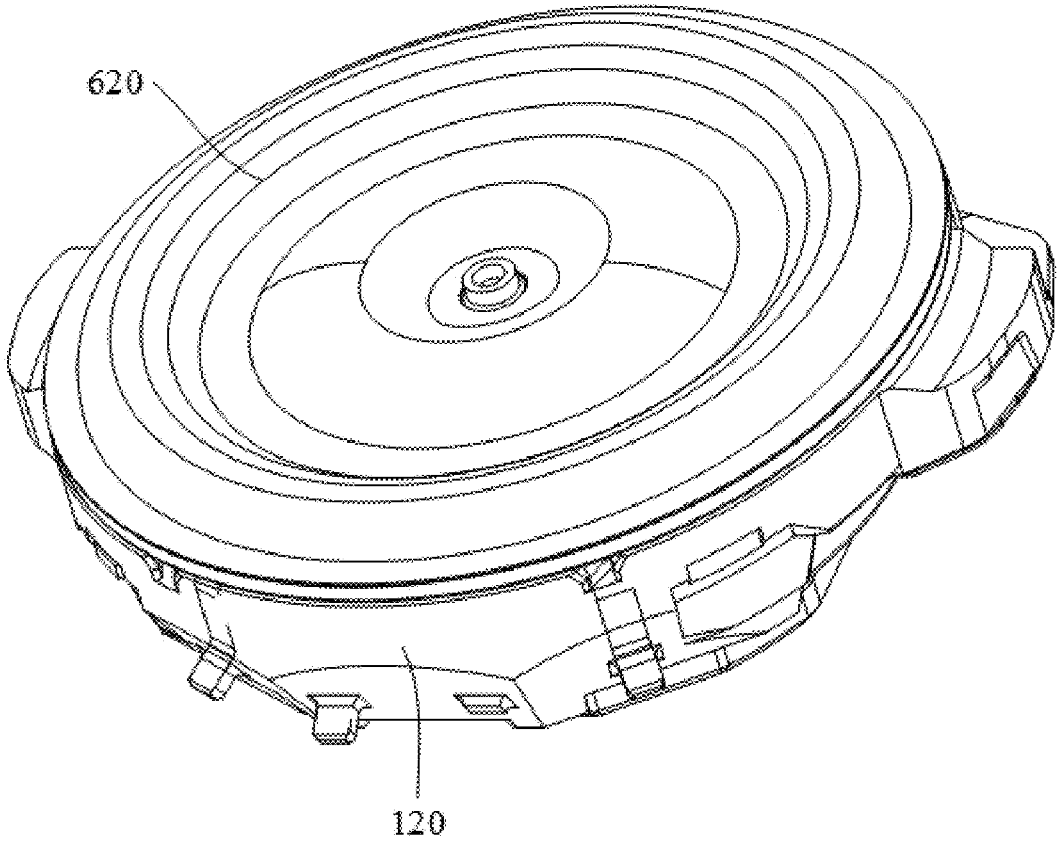
FIG. 1 is a schematic assembly view of a sound generator according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in some embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indications (such as up, down, left, right, front, rear, etc.) In some embodiments of the present application are only used to explain the relative positional relationship, movement situation, etc. among components in a specific attitude (as shown in the drawings). If the specific attitude changes, the directional indication also changes accordingly.

In addition, the descriptions related to “first”, “second” and the like in the present application are merely for descriptive purposes, and should not be understood as indicating or implying their relative importance or implicitly indicating the number of technical features indicated. Therefore, the features defined by “first” and “second” may explicitly or implicitly include at least one such feature. In addition, “and/or” in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

The present application provides a sound generator.

In some embodiments of the present application, as shown in FIG. 1 to FIG. 10, the sound generator includes:

- a magnetically conductive plate 110;
- a first magnetic structure 200 including a first magnet 210 and a first washer 220, the first magnet 210 and the first washer 220 are connected to each other, the first magnet 210 is provided on the magnetically conductive plate 110, the first washer 220 is fixedly connected to a side of the first magnet 210 away from the magnetically conductive plate 110, the first washer 220 includes a first sub-washer 221 provided in a middle area and a second sub-washer 222 provided surrounding the first sub-washer 221, and a treble magnetic gap H is formed between the first sub-washer 221 and the second sub-washer 222;
- a second magnetic structure 300 provided on the magnetically conductive plate 110 and provided surrounding the first magnetic structure 200, a bass magnetic gap L is formed between the first magnetic structure 200 and the second magnetic structure 300;
- a treble diaphragm 500 and a treble voice coil 400, the treble voice coil 400 is provided on a side of the treble diaphragm 500 close to the magnetically conductive plate 110 and is provided corresponding to the treble magnetic gap H; and
- a bass diaphragm 620 and a bass voice coil 610, the bass voice coil 610 is provided on a side of the bass diaphragm 620 close to the magnetically conductive plate 110 and is provided corresponding to the bass magnetic gap L.

In the technical solution of the present application, the first magnetic structure 200 not only forms the treble magnetic gap H, but also forms the bass magnetic gap L with the second magnetic structure 300, which is conducive to simplifying the magnetic structure of the sound generator and reducing the axial size of the sound generator. Specifically, at least a bass magnetic gap L is formed between the second sub-washer 222 and the second magnetic structure 300, the bass voice coil 610 is inserted in the bass magnetic gap L, and the first magnetic structure 200 can be at least partially accommodated in the inner side of the bass voice coil 610, which is helpful to further reduce the axial size of the sound generator. In this way, the sound generator can be miniaturized, and it is beneficial to improving the assembly convenience of audio device. Moreover, in the present application, the treble vibration system (that is, the treble voice coil 400 and the treble diaphragm 500) and the bass vibration system (that is, the bass voice coil 610 and the bass diaphragm 620) are set independently, and the treble sound and the bass sound are generated independently and do not interfere with each other, thereby ensuring the acoustic performance of the sound generator. In addition, the treble magnetic gap H is formed between the first sub-washer 221 and the second sub-washer 222. Under the magnetic conduction effect of the washers, the magnetic induction lines of the magnetic field in the treble magnetic gap H are more densely distributed, which is conducive to ensuring the treble performance of the sound generator.

It should be noted that the axial direction of the sound generator is the vibration direction of the treble diaphragm and bass diaphragm, and the radial direction is parallel to the extension direction of the magnetically conductive plate 110. In addition, in the following text, unless otherwise specified, the radial, axial and circumferential directions of the structure within the sound generator are all referred to this. In addition, the second sub-washer 222 may be composed of multiple arc-shaped parts, and the multiple arc-shaped parts may be closely matched in the circumferential direction to form a ring shape, or may be spaced apart in the circumferential direction to form a quasi-ring shape. The second sub-washer 222 may also be an integrated annular structure, and the second magnetic structure 300 is also configured with reference to the second sub-washer 222. It can be understood that the sound generator also includes a casing 120 provided on the magnetically conductive plate 110, and the vibration system and magnetic structure system of the sound generator are accommodated in the casing 120.

Figure 5:
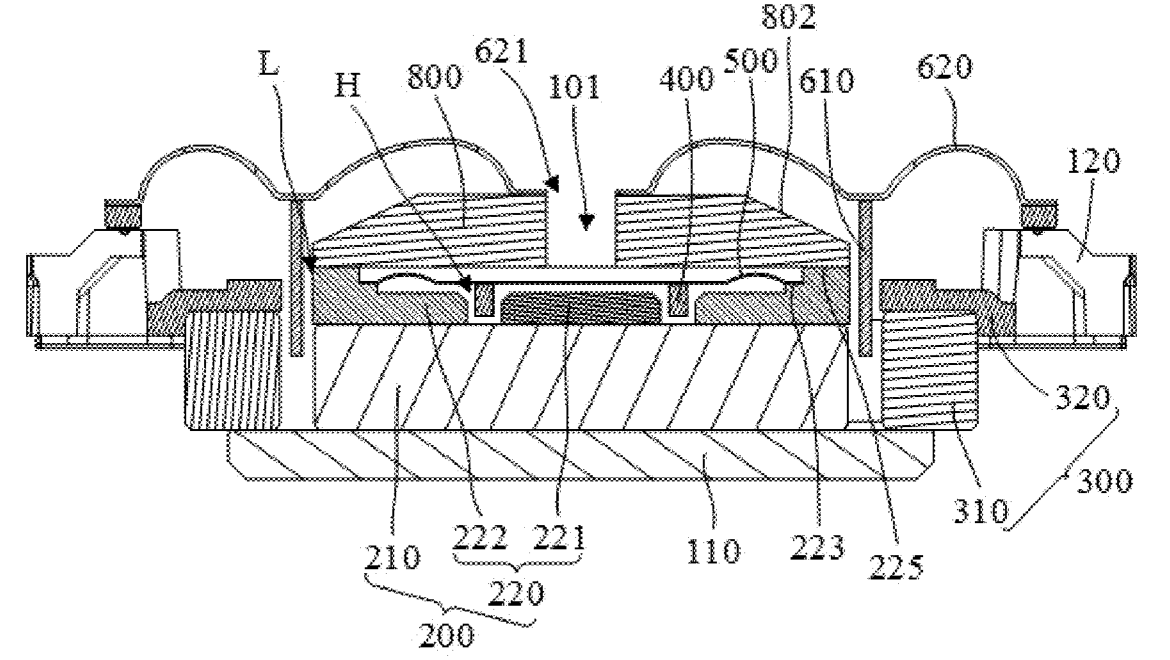
FIG. 5 is a schematic cross-section view of the sound generator according to yet some other embodiments of the present application.
Figure 7:
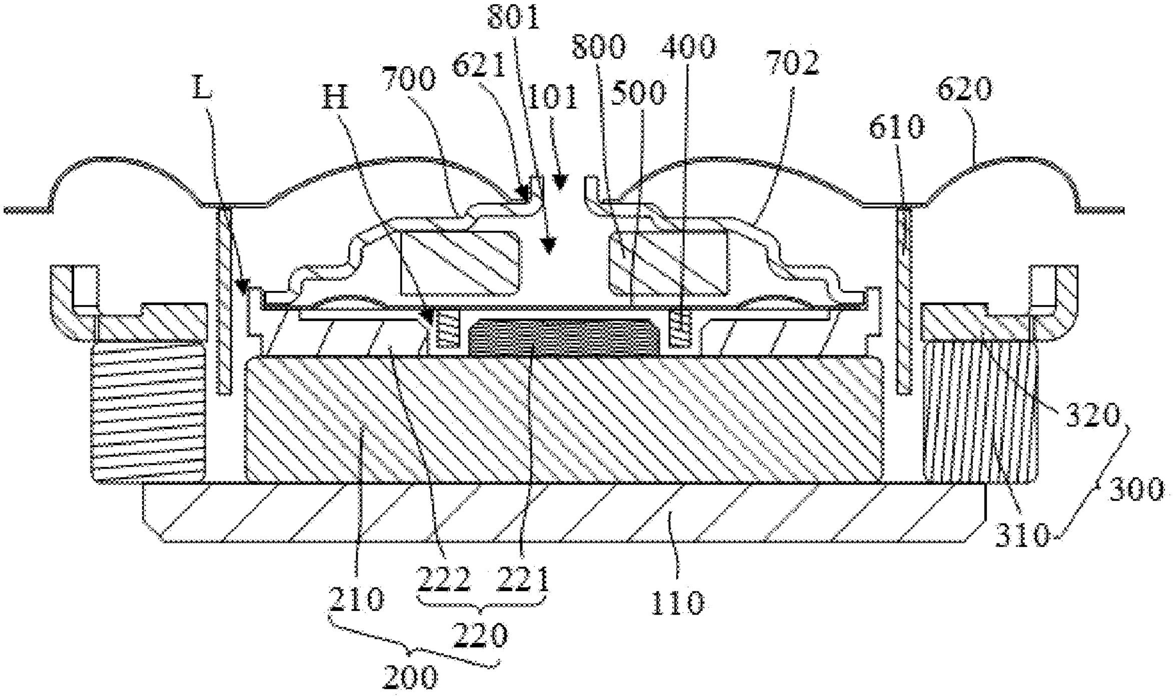
FIG. 7 is a schematic cross-section view of the sound generator according to still some other embodiments of the present application.
Figure 8:
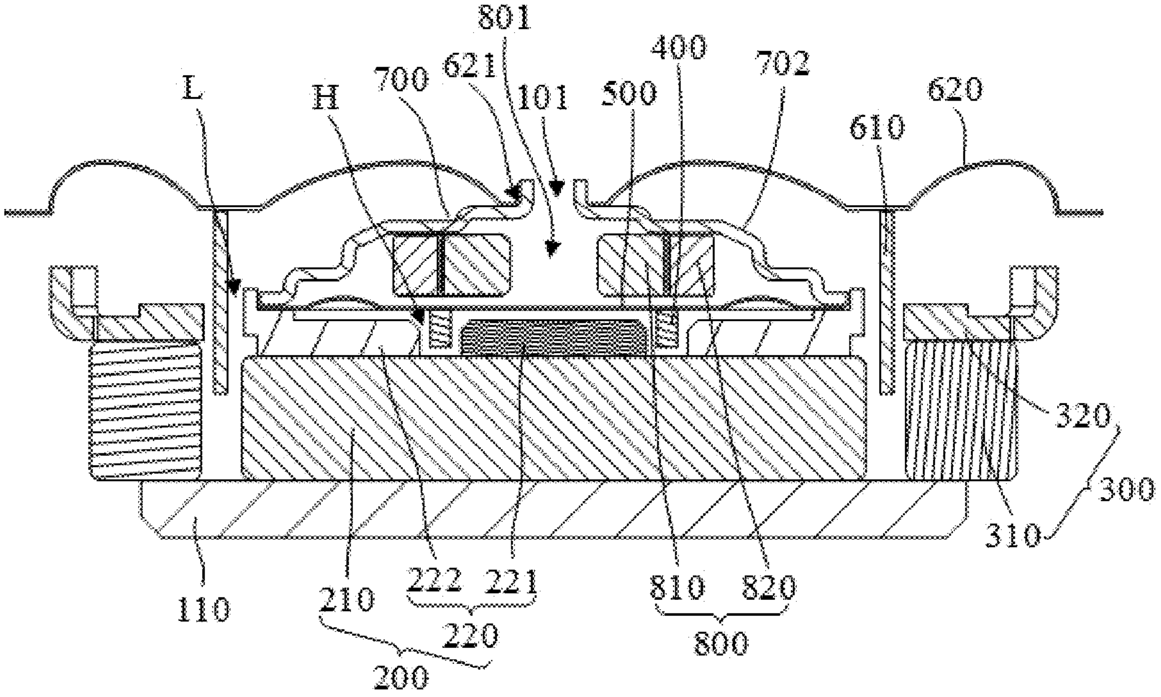
FIG. 8 is a schematic cross-section view of the sound generator according to still some other embodiments of the present application.

In some embodiments, as shown in FIG. 5, FIG. 7 and FIG. 8, the first magnet 210 is configured as an integral structure, a first magnetic zone is formed in a middle position of the first magnet 210, a second magnetic zone is formed surrounding the first magnetic zone, and a non-magnetic zone is formed between the first magnetic zone and the second magnetic zone. A magnetizing direction of the first magnetic zone is opposite to a magnetizing direction of the second magnetic zone, the first sub-washer 221 is provided corresponding to the first magnetic zone, and the second sub-washer 222 is provided corresponding to the second magnetic zone. The magnetizing direction of the first magnetic zone is the same as a magnetizing direction of a magnet of the second magnetic structure 300. In these embodiments, the magnetization process is performed on the integrated first magnet 210 one zone after another. Specifically, the magnetization method of the first magnetic zone and the second magnetic zone is axial magnetization, and the magnetization direction of the first magnetic zone and the second magnetic zone is on the contrary. After the first sub-washer 221 and the second sub-washer 222 are magnetically conducted, a treble magnetic gap H is formed between the first sub-washer 221 and the second sub-washer 222. The magnetization method of the second magnetic structure 300 is axial magnetization which is opposite to the magnetization direction of the second magnetic zone. Therefore, the bass magnetic gap L may be formed not only between the second magnetic structure 300 and the second magnetic zone of the first magnet 210, but also between the second magnetic structure 300 and the second sub-washer 222. Without loss of generality, the second magnetic structure 300 includes a second magnet 310 and a second washer 320. The second magnet 310 includes two semi-ring magnets fixed to the magnetically conductive plate 110. The second washer 320 is fixed to the side of the second magnet 310 away from the magnetically conductive plate 110. The magnetizing direction of the second magnet 310 is opposite to the magnetizing direction of the second magnetic zone. Under the magnetic conduction effect of the second washer 320 and the second sub-washer 222, the bass magnetic gap L is formed between the second washer 320 and the second sub-washer 222, and the magnetic induction lines of the magnetic field are more densely distributed. The bass voice coil 610 is inserted through the gap, which can improve the magnetic field utilization of the bass magnetic gap L, thus ensuring the bass performance of the sound generator. In these embodiments, the first magnet 210 is configured as an integral structure, which is beneficial to improving its installation convenience during assembly and improving the production efficiency of the sound generator. Certainly, in other embodiments, the first magnetic zone, the second magnetic zone and the second magnet 310 can be magnetized in a radial direction. At this time, in order to form a magnetic gap, the magnetizing directions of the three should remain the same, or, among the first magnetic zone, the second magnetic zone and the second magnet 310, some are magnetized in the axial direction and some are magnetized in the radial direction.

Further, in some embodiments, the treble voice coil 400 is provided corresponding to the non-magnetic area, and a ring width of the non-magnetic area is smaller than a ring width of the treble voice coil 400 In this way, it is beneficial to increase the magnetic field intensity of the first sub-washer 221 and the second sub-washer 222, thereby increasing the force of the magnetic field of the treble magnetic gap H on the treble voice coil 400, improving the efficiency of the electroacoustic conversion of the treble magnetic gap H, and improving the treble performance of the sound generator.

In some embodiments, a diameter of the first magnetic zone is less than or equal to a ring width of the second magnetic zone. In this way, the area of the second magnetic zone can be made larger, and the magnetic field strength of the second magnetic zone can be increased, which is conducive to balancing the electroacoustic conversion efficiency of the treble magnetic gap H and the bass magnetic gap L to ensure the treble performance and bass performance of the sound generator. In other embodiments, the diameter of the first magnetic zone may be larger than the ring width of the second magnetic zone, and the relationship between the diameter of the first magnetic zone and the ring width of the second magnetic zone may be adjusted according to different requirements for acoustic performance.

Figure 2:
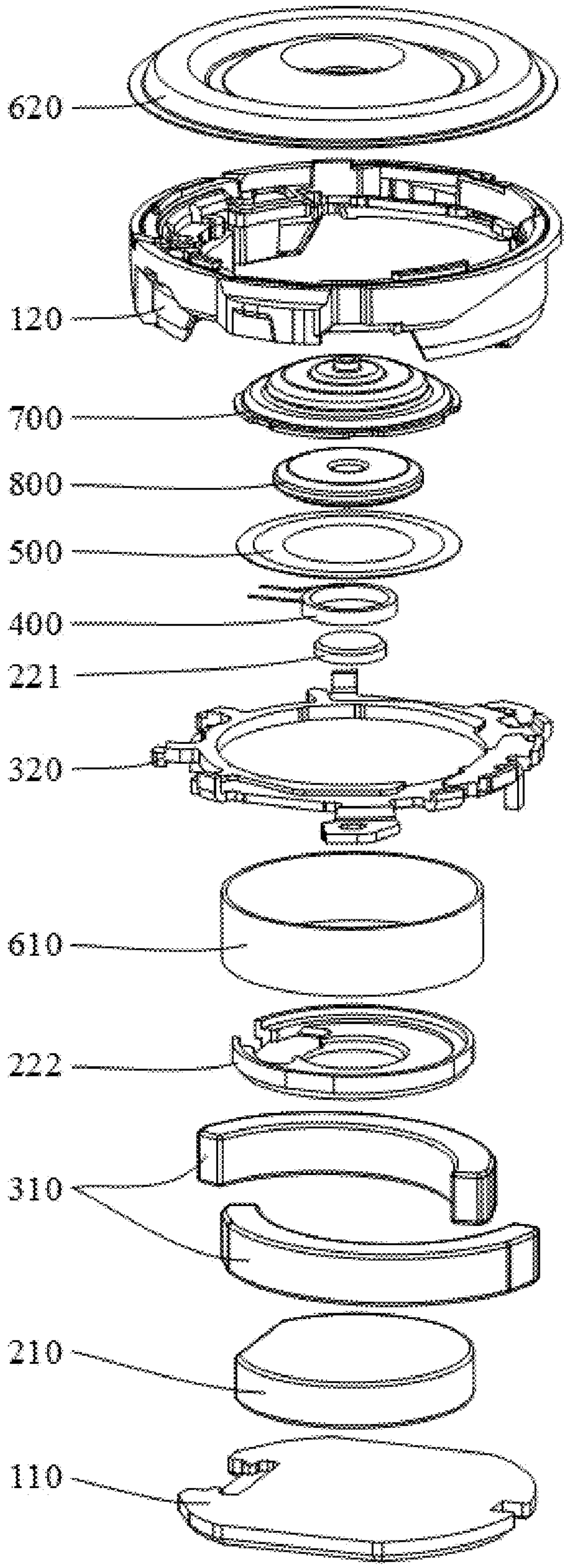
FIG. 2 is a schematic exploded view of the sound generator according to some embodiments of the present application.
Figure 4:
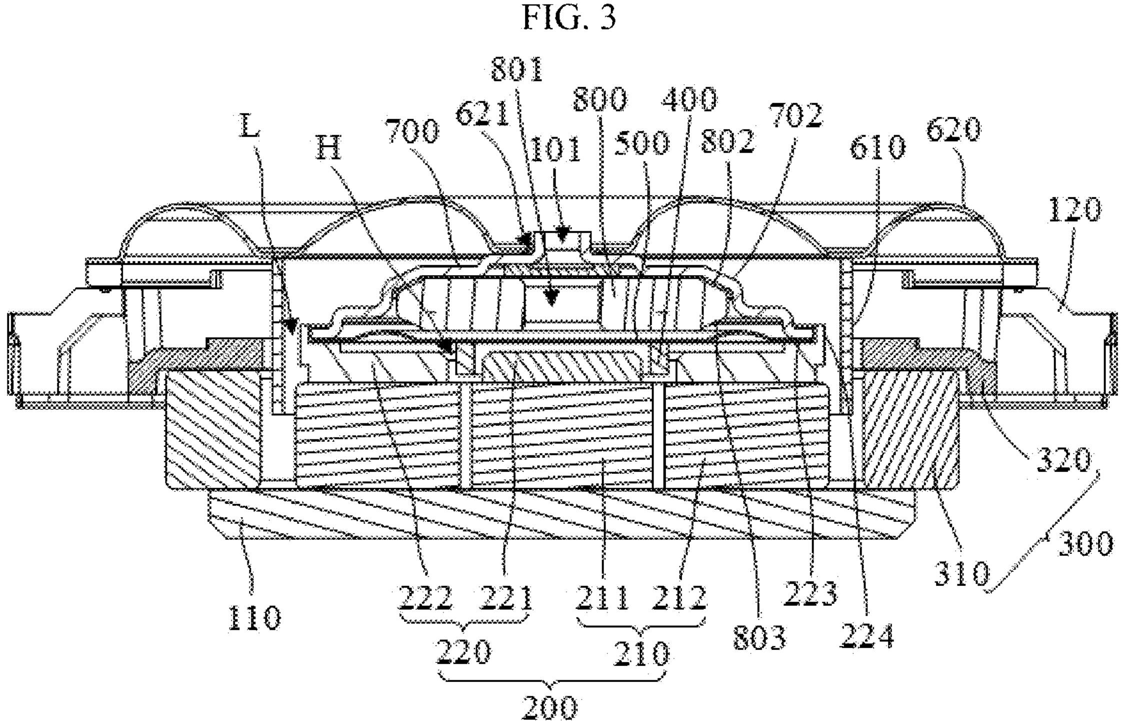
FIG. 4 is a schematic cross-section view of the sound generator according to some other embodiments of the present application.
Figure 6:
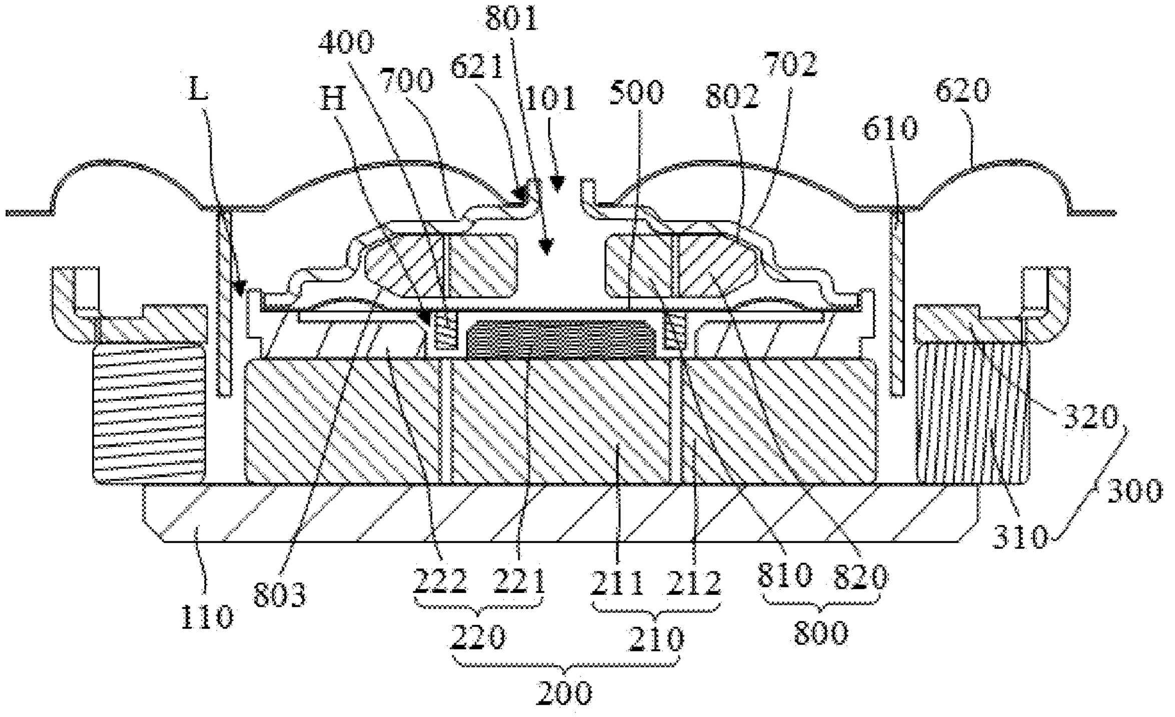
FIG. 6 is a schematic cross-section view of the sound generator according to still some other embodiments of the present application.

In some embodiments, as shown in FIG. 2, FIG. 4 and FIG. 6, the first magnet 210 includes a first sub-magnet 211 and a second sub-magnet 212, the first sub-magnet 211 and the second sub-magnet 212 are separately provided, the second sub-magnet 212 is provided surrounding the first sub-magnet 211, and a magnetizing direction of the first sub-magnet 211 is opposite to a magnetizing direction of the second sub-magnet 212. The first sub-washer 221 is fixedly connected to the first sub-magnet 211, and the second sub-washer 222 is fixedly connected to the second sub-magnet 212. The magnetizing direction of the first sub-magnet 211 is the same as a magnetizing direction of a magnet of the second magnetic structure 300. Specifically, the first sub-magnet 211 and the second sub-magnet 212 are magnetized in an axial magnetization manner. After the first sub-washer 221 and the second sub-washer 222 conducting magnetization, a treble magnetic gap H is formed between the first sub-washer 221 and the second sub-washer 222. The magnetization manner of the second magnetic structure 300 is axial magnetization which is opposite to the magnetization direction of the second sub-magnet 212. Therefore, the bass magnetic gap L can be formed not only between the second magnetic structure 300 and the second sub-magnet 212, but also between the second magnetic structure 300 the second sub-washer 222. Without loss of generality, the second magnetic structure 300 includes a second magnet 310 and a second washer 320. The second magnet 310 includes a semi-ring magnet fixed to the magnetically conductive plate 110. The washer 320 is fixed to the side of the second magnet 310 away from the magnetically conductive plate 110. The magnetizing direction of the second magnet 310 is opposite to the magnetizing direction of the second sub-magnet 212. Under the magnetic conduction effect of the second washer 320 and the second sub-washer 222, the magnetic induction lines between the second washer 320 and the second sub-washer 222 are more densely distributed, and the bass voice coil 610 is provided therebetween, which can improve the magnetic field utilization of the bass magnetic gap L to ensure the bass performance of the sound generator. In these embodiments, the first magnet 210 adopts a split structure, and the first sub-magnet 211 and the second sub-magnet 212 can be magnetized respectively. The magnetizing operation is simple and the material quality inspection is convenient. With sufficient material supply for the first sub-magnet The material supply of 211 and the second sub-magnet 212, the production of sound generators is ensured. Of course, in other embodiments, the first sub-magnet 211, the second sub-magnet 212 and the second magnet 310 can be magnetized in a radial direction. At this time, in order to form a magnetic gap, the magnetizing directions of the three should remain the same. Or, among the three, some adopt axial magnetization and some adopt radial magnetization.

In some embodiments, a gap between the first sub-magnet 211 and the second sub-magnet 212 is smaller than a gap between the first sub-washer 221 and the second sub-washer 222. In this way, a gap needs to be formed between the first sub-washer 221 and the second sub-washer 222 for the treble voice coil 400 to be inserted, the first sub-magnet 211 and the second sub-magnet 212 can be placed closer to maximize utilizing the internal space of the sound generator, and meanwhile to increase the magnetic field strength between the first sub-washer 221 and the second sub-washer 222. That is, the electroacoustic conversion efficiency of the treble magnetic gap H can be improved, which is beneficial to improving the treble performance sound of the sound generator. It is appropriate for the first sub-magnet 211 and the second sub-magnet 212 to be closely matched, that is, the smaller the gap between the two, the more conducive to improving the treble performance of the sound generator.

In some embodiments, a sound outlet 101 is provided at a position of the sound generator facing the treble diaphragm 500 and is configured to radiate sound waves of the treble diaphragm 500. The sound outlet 101 is provided corresponding to a center area of the bass diaphragm 620 where an avoidance hole 621 is provided to avoid the sound outlet 101. The bass diaphragm 620 is provided on a side of the treble diaphragm 500 away from the magnetically conductive plate 110. In this way, the treble and bass in the sound generator can be emitted in the same direction, so that the sound quality of the sound generator is transparent, and the treble and bass in the sound generator do not interfere with each other. The treble performance and bass performance of the sound generator are both guaranteed, which is conducive to improving the user experience.

In some embodiments, as shown in FIG. 2, FIG. 3, FIG. 6 and FIG. 8, the sound generator further includes a cover 700 provided on a side of the treble diaphragm 500 away from the magnetically conductive plate 110 and covering the second sub-washer 222. The cover 700 is provided with the sound outlet 101, the avoidance hole 621 is provided corresponding to the sound outlet 101, and an inner periphery of the bass diaphragm 620 corresponding to the avoidance hole 621 is fixedly connected to the cover 700. In this way, the inner circumference of the bass diaphragm 620 can be installed on the cover 700 relatively stably. Due to the isolation by the cover 700, the air vibration caused by the treble diaphragm 500 will not interfere with the bass diaphragm 620. The air vibration caused by the bass diaphragm 620 will not interfere with the treble diaphragm 500, which further ensures the independence between the treble and the bass of the sound generator, and further ensures the treble performance and bass performance of the sound generator. In addition, the outer periphery of the bass diaphragm 620 is fixedly connected to the periphery of the casing 120.

In some embodiments, as shown in FIG. 4 to FIG. 6 and FIG. 8, the sound generator further includes an auxiliary magnet 800 fixedly provided on the cover 700. The auxiliary magnet 800 is provided with a communication hole 801 at a position facing the sound outlet 101. It can be understood that the treble diaphragm 500 is located between the auxiliary magnet 800 and the first washer 220, and the air vibration caused by the treble diaphragm 500 can be transmitted through the communication hole 801 and the sound outlet 101 without disturbing the bass diaphragm 620. Further, the magnetizing direction of the auxiliary magnet 800 can be adjusted. Specifically, the magnetic field of the auxiliary magnet 800 can affect the magnetic induction lines not only between the second sub-washer 222 and the first sub-washer 221, but also between the second sub-washer 222 and the second sub-washer 320, which can correspondingly increases the magnetic field strength of the treble magnetic gap H or the bass magnetic gap L, thereby correspondingly improving the treble performance or bass performance of the sound generator.

Further, in these embodiments, the diameter of the first sub-magnet 211 is less than or equal to the ring width of the second sub-magnet 212. In this way, the area of the second sub-magnet 212 can be made larger, which is conducive to increasing the magnetic field strength of the second sub-magnet 212, and is conducive to balancing the electroacoustic conversion efficiency of the treble magnetic gap H and the bass magnetic gap L, thereby ensuring the treble sound performance and bass performance of the sound generator. Certainly, in other embodiments, the diameter of the first sub-magnet 211 may be greater than the ring width of the second sub-magnet 212, and the relationship between the diameter of the first sub-magnet 211 and the ring width of the second sub-magnet 212 may be adjusted according to different performance requirements.

In some embodiments, as shown in FIG. 5, the sound generator includes an auxiliary magnet 800. The auxiliary magnet 800 is provided on the side of the treble diaphragm 500 away from the magnetically conductive plate 110. An edge of the auxiliary magnet 800 is fixedly connected to a side of the second sub-washer 222 away from the magnetically conductive plate 110. A receiving space for accommodating the treble diaphragm 500 is formed between the auxiliary magnet 800 and the first washer 220. The auxiliary magnet 800 is provided with the sound outlet 101, the avoidance hole 621 is provided corresponding to the sound outlet 101, and an inner periphery of the bass diaphragm 620 corresponding to the sound outlet 101 is fixedly connected to the auxiliary magnet 800. In this way, due to the isolation of the auxiliary magnet 800, the air vibration caused by the treble diaphragm 500 will not interfere with the bass diaphragm 620, and the air vibration caused by the bass diaphragm 620 will not interfere with the treble diaphragm 500, which ensures the independence between the treble and bass of the sound generator to further ensure the treble performance and bass performance of the sound generator. Further, the magnetizing direction of the auxiliary magnet 800 can be adjusted. Specifically, the magnetic field of the auxiliary magnet 800 can affect the magnetic field not only between the second sub-washer 222 and the first sub-washer 221, but also between the second sub-washer 222 and the second sub-washer 320, which may correspondingly increase the magnetic field strength of the treble magnetic gap H or the bass magnetic gap L, thereby correspondingly improving the treble performance or bass performance of the sound generator. It can be understood that the formation of the bass magnetic gap L and the treble magnetic gap H are related to the first magnetic structure 200, especially to the second magnetic zone (corresponding to the second sub-magnet 211 in the split first magnet 210). Therefore, when it is necessary to adjust the electroacoustic conversion efficiency of the bass magnetic gap L or the treble magnetic gap H, adjusting the first magnetic structure 200 and the second magnetic structure 300 may cause big changes of another magnetic gap. In many times, it's necessary to correspondingly adjust the first magnetic structure 200 and the second magnetic structure 300 at the same time, resulting in a heavy workload of adjustment and verification. While adjusting the auxiliary magnet 800 does not involve the adjustment of the main magnetic structure, thereby conveniently adjusting the magnetic field strength of the treble magnetic gap H or the bass magnetic gap L, thus obtaining the required electroacoustic conversion efficiency.

In some embodiments, the auxiliary magnet 800 is formed with a single magnetic zone.

Figure 9:
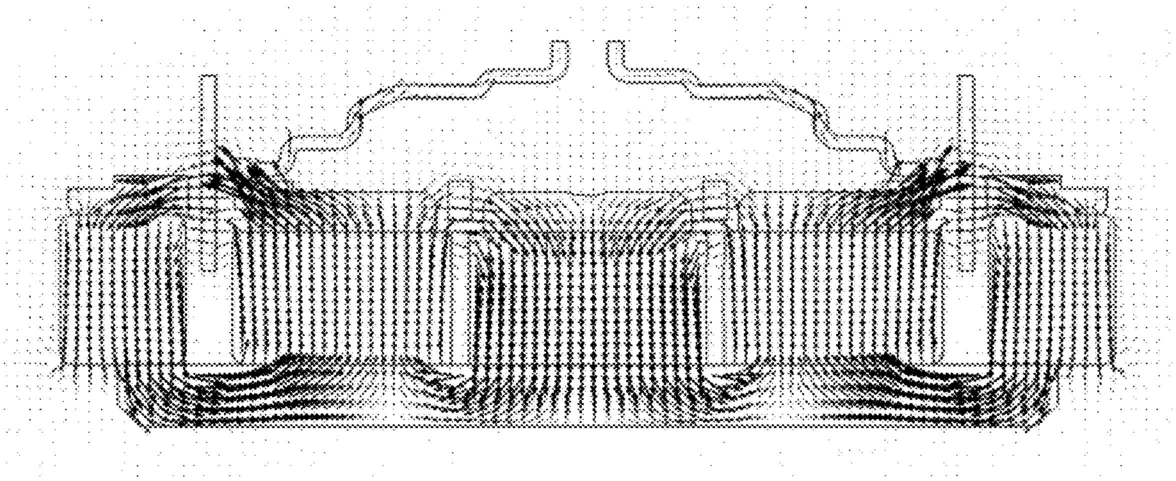
FIG. 9 is a simulation view of a magnetic field of the sound generator in FIG. 3 in response to a cover conducting magnetic according to some embodiments of the present application.
Figure 12:
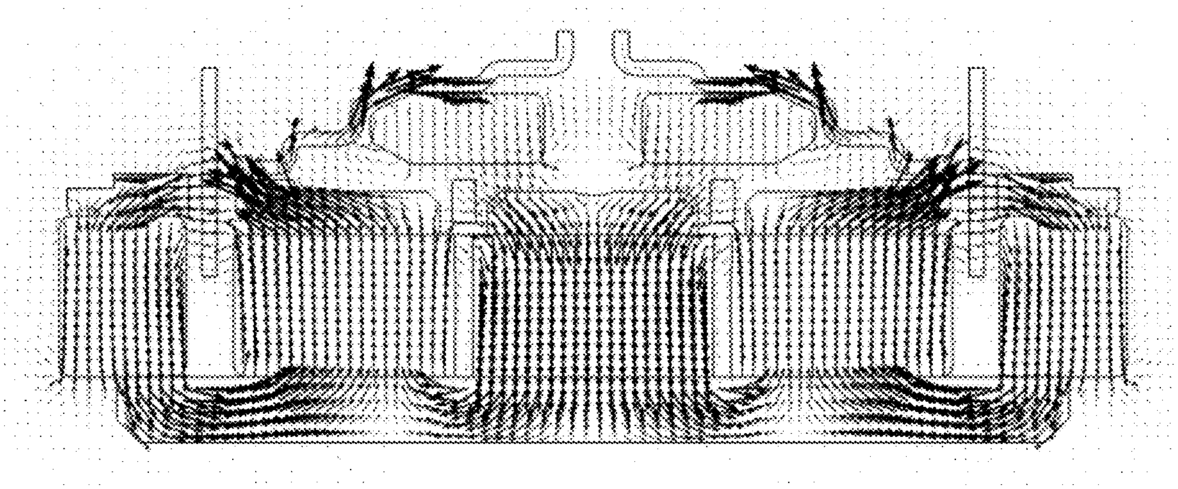
FIG. 12 is a simulation view of a magnetic field of the sound generator in FIG. 4 in response to a cover conducting magnetic according to some other embodiments of the present application.

In some embodiments, the magnetizing direction of the single magnetic zone is consistent with the first magnetic zone (corresponding to the integral structure of the first magnet 210) or the first sub-magnet 211 (corresponding to the split structure of the first magnet 210). As shown in FIG. 9 and FIG. 12, the difference between the structures of the sound generators in FIG. 9 and FIG. 12 is that the structure of FIG. 9 is not provided with an auxiliary magnet, while the structure of FIG. 12 is provided with an auxiliary magnet 800, and the auxiliary magnet 800 forms a single magnetic zone as mentioned above. The bass BL (power coupling factor) of FIG. 9 is 0.56921 and the treble BL (power coupling factor) is 0.1811; the bass BL of FIG. 12 is 0.5802, and the treble BL is 0.138523. It can be seen that under the action of the auxiliary magnet 800, the magnetic induction lines in the bass magnetic gap L increase, and more magnetic induction lines can pass through the bass voice coil 610, such that the bass BL is significantly improved, which is beneficial to improving the sensitivity of the bass unit. When the whole machine is debugged to improve the bass performance, this magnetization method can be used.

Figure 10:
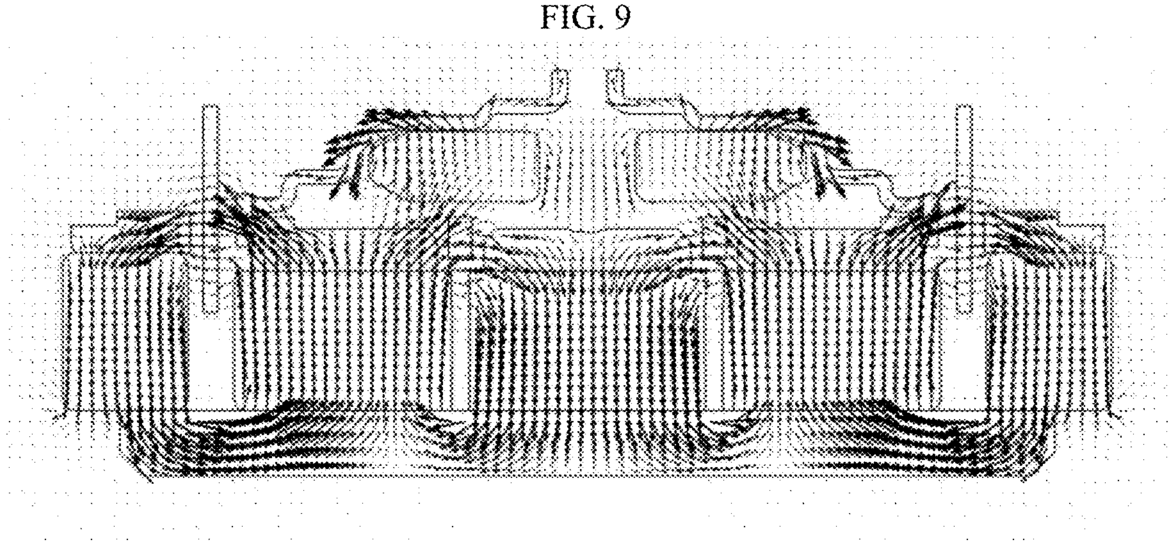
FIG. 10 is a simulation view of a magnetic field of the sound generator in FIG. 4 in response to a cover conducting magnetic according to some embodiments of the present application.

In some embodiments, the magnetizing direction of the single magnetic zone is consistent with the second magnetic zone (corresponding to the integral structure of the first magnet 210) or the second sub-magnet 212 (corresponding to the split structure of the second magnet 310). As shown in FIG. 9 and FIG. 10, the difference between the structures of the sound generators in FIG. 9 and FIG. 10 is that the structure in FIG. 9 is not provided with an auxiliary magnet, while the structure in FIG. 10 is provided with an auxiliary magnet 800, and the auxiliary magnet 800 forms a single magnetic zone as mentioned above. The bass BL of FIG. 9 is 0.56921 and the treble BL is 0.1811. The bass BL of FIG. 10 is 0.56521 and the treble BL is 0.22983. It can be seen that under the action of the auxiliary magnet 800, the magnetic induction lines in the treble magnetic gap H increase, and more magnetic induction lines can pass through the treble voice coil 400, such that the treble BL is significantly improved, which is beneficial to improving the electroacoustic conversion efficiency of the treble unit. When the whole machine is debugged to improve the treble performance, this magnetization method can be used.

Furthermore, in these embodiments, the orthographic projection of the treble magnetic gap H is located within the area of the orthographic projection of the auxiliary magnet 800. The orthographic projection of the treble magnetic gap H refers to the gap between the projections of the first sub-washer 221 and the second sub-washer 222 on the magnetically conductive plate 110, and the orthographic projection of the auxiliary magnet 800 refers to the projection of the auxiliary magnet 800 on the magnetically conductive plate 110. In this way, the auxiliary magnet 800 can not only have a portion corresponding to the first magnetic zone (which can correspond to the first sub-magnet 211 when the first magnet 210 is a split structure, which will not be described again later) at the center, but also can have a portion corresponding to the second magnetic area (which may correspond to the second sub-magnet 212 when the first magnet 210 is a split structure, which will not be described again later) on the peripheral side. Such that the auxiliary magnet 800 can be magnetized as a single magnetic zone in the above two situations. Specifically, when the magnetization direction of the auxiliary magnet 800 is opposite to that of the first magnetic zone, the magnetic induction lines at the center of the auxiliary magnet 800 can be connected to the magnetic induction lines of the second magnetic zone to increase the magnetic induction lines of the treble magnetic gap H. So that more magnetic induction lines pass through the treble voice coil 400. When the magnetization direction of the auxiliary magnet 800 is opposite to the second magnetic zone, the magnetic induction lines of the peripheral part of the auxiliary magnet 800 can be connected to the second magnetic induction lines of the second magnetic structure 300 to increase the magnetic induction lines at the bass magnetic gap L, so that more magnetic induction lines pass through the bass voice coil 610.

Figure 13:
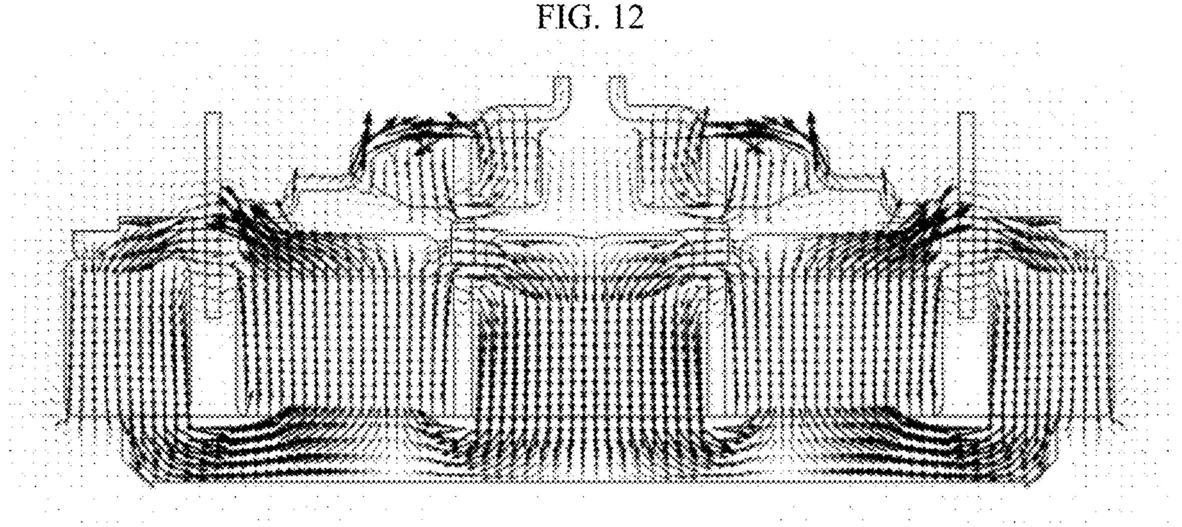
FIG. 13 is a simulation view of a magnetic field of the sound generator in FIG. 6 in response to a cover conducting magnetic according to some embodiments of the present application.

In one embodiment, the auxiliary magnet 800 is formed with dual magnetic zones, the dual magnetic zones include a third magnetic zone opposite to the first magnetic zone and a fourth magnetic zone opposite to the second magnetic zone. The magnetization direction of the third magnetic zone is opposite to the magnetization direction of the first magnetic zone. The magnetization direction of the fourth magnetic zone is opposite to the magnetization direction the second magnetic zone. In this way, the auxiliary magnet 800 can also have a part corresponding to the first magnetic zone at the center position, and a part corresponding to the second magnetic zone at the peripheral position. By adjusting the magnetization amount of the third magnetic zone and the fourth magnetic zone, different requirements of treble BL and bass BL can be satisfied. As shown in FIG. 9 and FIG. 13, the difference between the structures of the sound generators in FIG. 9 and FIG. 13 is that the structure of FIG. 9 is not provided with an auxiliary magnet, while the structure of FIG. 13 is provided with an auxiliary magnet 800. The auxiliary magnet 800 is formed with double magnetic zones, and the magnetization directions of the double magnetic zones are as mentioned above. The bass BL of FIG. 9 is 0.56921, and the treble BL is 0.1811; while the bass BL of FIG. 13 is 0.57533, and the treble BL is 0.25425. It can be seen that the third magnetic zone and the fourth magnetic zone provided by the auxiliary magnet 800 can affect the direction of the magnetic induction lines at the treble magnetic gap H and the bass magnetic gap L, so that more magnetic induction lines pass through the treble voice coil 400 and the bass voice coil 610, thereby improving treble BL and bass BL, among which the improvement of treble BL is more significant. When debugging the whole machine to improve the treble performance and bass performance at the same time, this magnetization method can be used.

In these embodiments, as shown in FIG. 4 and FIG. 7, the auxiliary magnet 800 is configured as an integral structure, and the auxiliary magnet 800 is also formed with a second non-magnetic zone located between the third magnetic zone and the fourth magnetic zone. The second non-magnetic zone is conducive to improving the installation convenience of the auxiliary magnet 800 during assembly, thereby further improving the production efficiency of the sound generator.

In these embodiments, as shown in FIG. 6 and FIG. 8, the auxiliary magnet 800 includes a first auxiliary magnet 810 and a second auxiliary magnet 820 arranged separately, and the second auxiliary magnet 820 is surrounding the first auxiliary magnet 810. A third magnetic zone is formed on the first auxiliary magnet 810, and a fourth magnetic zone is formed on the second auxiliary magnet 820. In these embodiments, the auxiliary magnet 800 includes a first auxiliary magnet 810 and a second auxiliary magnet 820 that are separately arranged. The first auxiliary magnet 810 and the second auxiliary magnet 820 can be magnetized respectively. The magnetizing operation is simple and convenient for material quality inspection, and the material supply of the first auxiliary magnet 810 and the second auxiliary magnet 820 is guaranteed, thereby ensuring the production of sound generators. The gap between the first auxiliary magnet 810 and the second auxiliary magnet 820 is set corresponding to the treble magnetic gap H, and it is appropriate for the first auxiliary magnet 810 and the second auxiliary magnet 820 to closely match each other, that is, the smaller the gap between the first auxiliary magnet 810 and the second auxiliary magnet 820, the better the acoustic performance of the sound generator.

Figure 11:
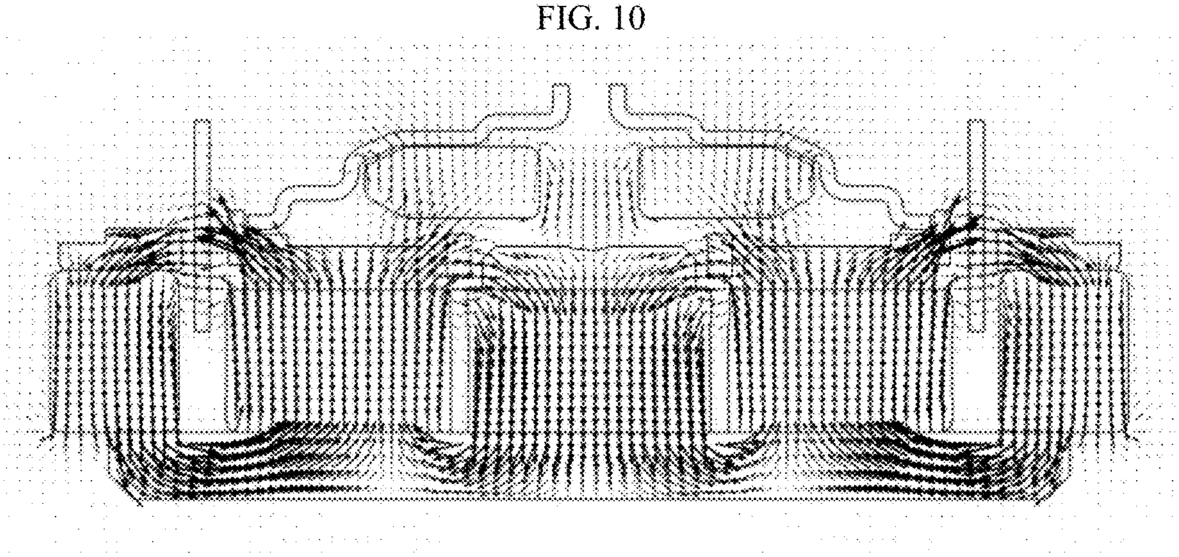
FIG. 11 is a simulation view of a magnetic field of the sound generator in FIG. 4 in response to a cover failing to conduct magnetic according to some embodiments of the present application.

Furthermore, in these embodiments, the cover 700 is made of magnetically conductive material. As shown in FIG. 10 and FIG. 11, FIG. 10 and FIG. 11 are simulation views of a magnetic field of the sound generators of the same structure in response to that the cover is magnetically conductive and non-conductive. In FIG. 10, the bass BL is 0.56521, and the treble BL is 0.22983; while in FIG. 11, the bass BL is 0.55447, and the treble BL is 0.21978. It can be seen that the magnetic conductivity of the cover 700 is beneficial to increasing the magnetic field strength of the treble magnetic gap H and the bass magnetic gap L, and can improve the treble BL and bass BL of the sound generator, thereby improving the acoustic performance of the sound generator.

In some embodiments, as shown in FIG. 4 and FIG. 6, the auxiliary magnet 800 is located between the treble diaphragm 500 and the bass diaphragm 620, and a first avoidance portion 803 is provide on a side of the auxiliary magnet 800 close to the treble diaphragm 500 to avoid the folded portion of the treble diaphragm 500. Specifically, the first avoidance portion 803 is a structure formed by the surface of the auxiliary magnet 800 close to the treble diaphragm 500 inclining in a direction away from the treble diaphragm 500. In this way, when the folded portion of the treble diaphragm 500 vibrates in a direction away from the magnetically conductive plate 110, the auxiliary magnet 800 is prevented from making an interference, thereby ensuring the treble performance of the sound generator. In other embodiments, as shown in FIG. 7 and FIG. 8, the auxiliary magnet 800 may not have a portion disposed corresponding to the folded portion of the treble diaphragm 500.

Further, in these embodiments, as shown in FIG. 4 to FIG. 6, the side of the auxiliary magnet 800 close to the bass diaphragm 620 is provided with a second avoidance portion 802 to avoid the folded ring portion of the bass diaphragm 620. Specifically, the second escape portion 802 is a structure formed by the surface of the auxiliary magnet 800 close to the bass diaphragm 620 inclining in a direction away from the bass diaphragm 620. In this way, when the folded portion of the bass diaphragm 620 vibrates in a direction close to the magnetically conductive plate 110, the auxiliary magnet 800 is prevented from making an interference to ensure the bass performance of the sound generator. Further, when the cover 700 is provided on the side of the auxiliary magnet 800 away from the magnetically conductive plate 110, the cover 700 is provided with a third avoidance portion 702 on the side close to the bass diaphragm 620 to avoid the folded ring portion of bass diaphragm 620. The second avoidance portion 802 are adapted to the third avoidance portion 702. In this way, when the folded portion of the bass diaphragm 620 vibrates in a direction close to the magnetically conductive plate 110, the cover body 700 can be prevented from making an interference to further ensure the bass performance of the sound generator, and also enable the auxiliary magnet 800 to fit more closely to the cover 700, thereby making the connection between the auxiliary magnet 800 and the cover 700 more stable when the auxiliary magnet 800 is bonded to the cover 700. In other embodiments, it is also possible that, as shown in FIG. 7 and FIG. 8, the auxiliary magnet 800 does not have a portion arranged corresponding to the folded portion of the bass diaphragm 620 that extends obliquely toward the magnetically conductive plate 110.

Figure 3:
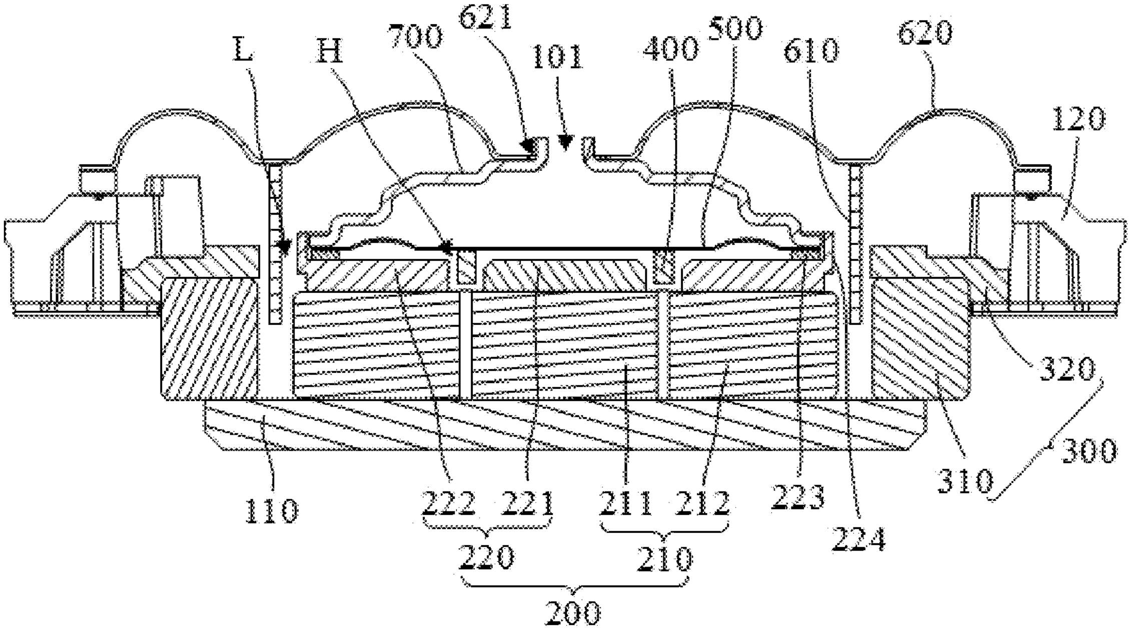
FIG. 3 is a schematic cross-section view of the sound generator according to some embodiments of the present application.

In some embodiments, as shown in FIG. 3 and FIG. 5, a side of the second sub-washer 222 away from the magnetically conductive plate 110 is provided with a mounting ring protrusion 223, and an outer periphery of the treble diaphragm 500 is fixedly connected to the mounting ring protrusion 223 The mounting ring protrusion 223 may be integrally formed on the second sub-washer 222, or may be an independent structure from the second sub-washer 222 and fixed to the second sub-washer 222 by bonding or snapping. The outer periphery of the treble diaphragm 500 is connected to the mounting ring protrusion 223. In this way, in the inner space of the mounting ring protrusion 223, there can be a gap not only between the treble diaphragm 500 and the second sub-washer 222, but also between the treble diaphragm 500 and the first sub-washer 221. This gap is larger than the amplitude of the treble diaphragm 500 so that the vibration of the treble diaphragm 500 is not disturbed, thereby ensuring the treble performance of the sound generator. Especially, as shown in FIG. 5, when the sound generator is only provided with the auxiliary magnet 800 without a cover, the second sub-washer 222 should also form a ring convex structure 225 on the outer periphery of the mounting ring protrusion 223 fixedly connected to the treble diaphragm 500. The ring convex structure 225 is protruding in a direction away from the magnetically conductive plate 110 from the mounting ring protrusion 223, and is used for fixed connection of the auxiliary magnet 800. In this way, there is enough space not only between the auxiliary magnet 800 and the first sub-washer 221, but also between the auxiliary magnet 800 and the second sub-waste 222 for the treble diaphragm 500 to vibrate.

Further, in these embodiments, as shown in FIG. 3 and FIG. 4, the outer peripheral portion of the cover 700 is disposed corresponding to the mounting ring protrusion 223 and is fixed to a side of the treble diaphragm 500 away from the mounting ring. The outer circumference of the mounting ring protrusion 223 is connected with a limiting ring protrusion 224 protruding in a direction away from the magnetically conductive plate 110 from the mounting ring protrusion 223. The cover 700 is limited to the inner side of the limiting ring protrusion 224. In this way, it is helpful to improve the installation stability of the cover 700 on the second sub-washer 222 to ensure the structural stability of the sound generator. In addition, the limiting ring protrusion 224 can also provide a positioning function when assembling the cover body 700, which is beneficial to improve the assembly convenience of the cover 700, thereby improving the production efficiency of the sound generator.

The present application also provides an audio device. The audio device includes a sound generator. The specific structure of the sound generator refers to the above-mentioned embodiments. Since this audio device adopts all the technical solutions of all the above-mentioned embodiments, it has at least all the beneficial effects brought about by the above-mentioned embodiments, which will not be repeated here. The audio device includes headphones, speakers, mobile phones or computers, etc.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A sound generator, comprising:

a magnetically conductive plate;

a first magnetic structure comprising a first magnet and a first washer connected to the first magnet, wherein the first magnet is provided on the magnetically conductive plate, the first washer is fixedly connected to a side of the first magnet away from the magnetically conductive plate, the first washer comprises a first sub-washer provided in a middle area and a second sub-washer provided surrounding the first sub-washer, and a treble magnetic gap is formed between the first sub-washer and the second sub-washer;

a second magnetic structure provided on the magnetically conductive plate and provided surrounding the first magnetic structure, wherein a bass magnetic gap is formed between the first magnetic structure and the second magnetic structure;

a treble diaphragm and a treble voice coil, wherein the treble voice coil is provided on a side of the treble diaphragm close to the magnetically conductive plate and is provided corresponding to the treble magnetic gap;

a bass diaphragm and a bass voice coil, wherein the bass voice coil is provided on a side of the bass diaphragm close to the magnetically conductive plate and is provided corresponding to the bass magnetic gap;

a sound outlet provided at a position of the sound generator facing the treble diaphragm and configured to radiate sound waves of the treble diaphragm, wherein the sound outlet is provided corresponding to a center area of the bass diaphragm, the bass diaphragm is provided with an avoidance hole to avoid the sound outlet, and the bass diaphragm is provided on a side of the treble diaphragm away from the magnetically conductive plate;

a cover provided on a side of the treble diaphragm away from the magnetically conductive plate and covering the second sub-washer, wherein the cover is provided with the sound outlet, the avoidance hole is provided corresponding to the sound outlet, and an inner periphery of the bass diaphragm corresponding to the avoidance hole is fixedly connected to the cover; and an auxiliary magnet fixedly provided on the cover, wherein the auxiliary magnet is provided with a communication hole at a position facing the sound outlet.

2. The sound generator of claim 1, wherein the first magnet is configured as an integral structure, a first magnetic zone is formed in a middle position of the first magnet, a second magnetic zone is formed surrounding the first magnetic zone, and a non-magnetic zone is formed between the first magnetic zone and the second magnetic zone;

a magnetizing direction of the first magnetic zone is opposite to a magnetizing direction of the second magnetic zone, the first sub-washer is provided corresponding to the first magnetic zone, and the second sub-washer is provided corresponding to the second magnetic zone; and the magnetizing direction of the first magnetic zone is the same as a magnetizing direction of a magnet of the second magnetic structure.

3. The sound generator of claim 2, wherein the treble voice coil is provided corresponding to the non-magnetic area, and a ring width of the non-magnetic area is smaller than a ring width of the treble voice coil; and/or a diameter of the first magnetic zone is less than or equal to a ring width of the second magnetic zone.

4. The sound generator of claim 1, wherein the first magnet comprises a first sub-magnet and a second sub-magnet, the first sub-magnet and the second sub-magnet are separately provided, the second sub-magnet is provided surrounding the first sub-magnet, and a magnetizing direction of the first sub-magnet is opposite to a magnetizing direction of the second sub-magnet;

the first sub-washer is fixedly connected to the first sub-magnet, and the second sub-washer is fixedly connected to the second sub-magnet; and the magnetizing direction of the first sub-magnet is the same as a magnetizing direction of a magnet of the second magnetic structure.

5. The sound generator of claim 4, wherein a gap between the first sub-magnet and the second sub-magnet is smaller than a gap between the first sub-washer and the second sub-washer; and/or a diameter of the first sub-magnet is less than or equal to a ring width of the second sub-magnet.

6. The sound generator of claim 1, wherein a side of the second sub-washer away from the magnetically conductive plate is provided with a mounting ring protrusion, and an outer periphery of the treble diaphragm is fixedly connected to the mounting ring protrusion; and/or the second magnetic structure comprises a second magnet and a second washer, the second magnet is fixedly connected to the magnetically conductive plate, and the second washer is fixedly connected to a side of the second magnet away from the magnetically conductive plate.

7. An audio device, comprising the sound generator of claim 1.

8. The audio device of claim 7, wherein the audio device is an earphone.

* * * * *